HOLE COUNT CHECKER

Filed May 31, 1962 3 Sheets-Sheet 1

INVENTOR
GEORGE R. COGAR

BY John R. Manning
ATTORNEY

April 2, 1968 G. R. COGAR 3,376,408

HOLE COUNT CHECKER

Filed May 31, 1962 3 Sheets-Sheet 2

United States Patent Office
3,376,408
Patented Apr. 2, 1968

3,376,408
HOLE COUNT CHECKER

George R. Cogar, Norwalk, Conn., assignor to Sperry Rand Corporation, New York, N.Y., a corporation of Delaware Filed May 31, 1962, Ser. No. 198,808
12 Claims. (Cl. 235—61.7)

ABSTRACT OF THE DISCLOSURE

This invention relates to a hole count checker employed with card reading apparatus. In this invention the total number of holes in a punch card are counted at a first reading station and compared with the number of holes counted in a second reading station. A register including a binary adder is proved to accumulate the total number of holes sensed by the first reading station. When the card has been completely sensed the sum stored in the first register is transferred to a second register which includes a binary subtractor. The card is then transferred to a second reading station. The binary subtractor is proved to subtract a "1" from the contents of the second register whenever there is a hole detected on the card by the second sensing station. When the card has been completely sensed at the second station the contents of the second register will be zero if no errors have occurred.

Present day electronic data processing machines utilize a variety of input and output devices. One such device is a card reader-punch wherein information is stored in the form of discrete holes on punched cards. The punched cards are loaded into the card reader and the cards are read by mechanism contained therein. To establish a high degree of accuracy, the information on the punched cards must be interpreted accurately and transferred to the data processing machine. During the card reading process, the reading station of the card reader may generate spurious or unwanted pulses and thus cause false and incorrect information to be transferred to the data processing machine. The spurious signals or unwanted pulses may occur at the reading station by the failure of a reading device, such as a brush, to engage the hole of the card and thus prevent an output; by foreign matter upon the card; by the generation of a pulse from a reading device even though a hole has not been engaged in the card; or, by any other error inducing means. Thus, it is desirable to detect these errors and to indicate that they have occurred.

During the reading and transferring operations, there is a possibility of losing or gaining one or more of the pulse signals, so that the distribution of pulse signals no longer correctly represents the desired information. If the changing of the information by the loss or gain of a pulse signal is undetected and the succeeding operations are permitted to proceed, the results of the data processing operation will be erroneous. The error detection system of the present invention is simple and reliable, and will detect whether the number of holes in a punched card read at a first station is equal to the number of information-bearing holes read at a second station.

Accordingly, it is an object of this invention to improve error-detecting apparatus in punched card reading machines.

It is another object of the invention to improve error detecting apparatus for detecting errors which occur due to the loss or gain of pulse signals in transferred information.

It is another object of the invention to provide an improved error detector employing pulse signal counting techniques.

It is a further object of the invention to provide an error detection system wherein the number of holes in a punched card are determined at two different reading stations and the number of holes calculated at each station are then compared.

In accordance with the present invention, for each card, the total number of holes sensed at a first station must be equal to the number of holes sensed at a second station. If not, error indicating means are enabled. A binary adder coupled to a dynamic accumulator or register is provided to accumulate the total number of holes at the first station. This sum is stored in the first dynamic accumulator. When the card has been completely sensed at the first station, the sum, representative of the total number of holes in a card, is transferred from the first dynamic accumulator or register to a second dynamic accumulator or register. The card then progresses to the second sensing station. A binary subtractor is provided in circuit with the second accumulator to subtract a "one" from the contents of the second accumulator or register whenever a hole in the card is detected at the second sensing station. When the card has been completely sensed at the second sensing station, the contents of the second dynamic accumulator or register should be zero if an error has not occurred.

Other objects, features and advantages of the invention will be evident from the following detailed description when read in connection with the accompanying drawings wherein.

Figure 1:
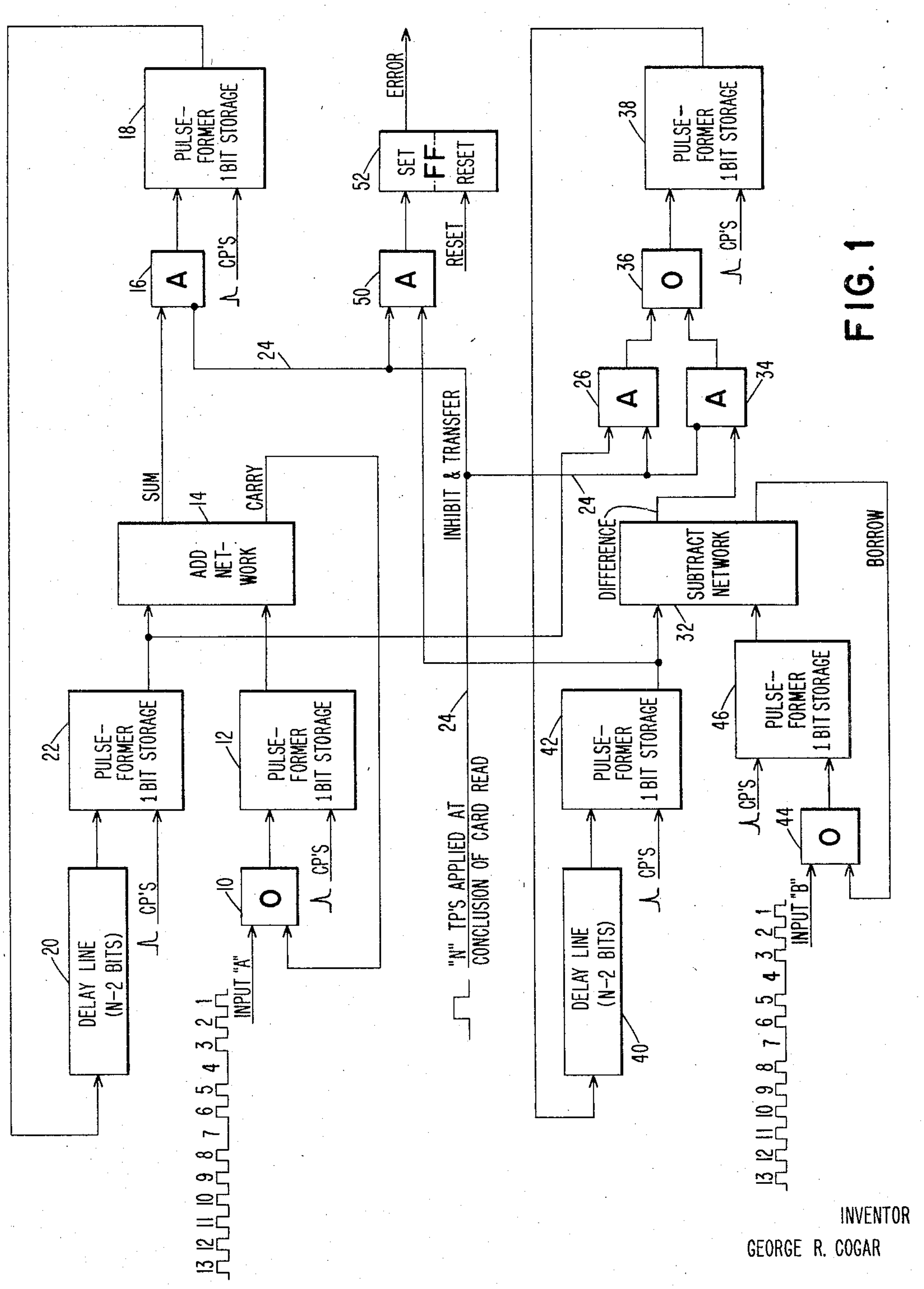
FIGURE 1 is a block diagram of the hole count checker showing the two dynamic accumulators and the circuitry associated therewith.

As shown in the FIGURE 1, the OR circuit 10 receives input signals and is coupled to apply its output to a pulseformer 12. The pulseformer 12, as well as the other pulseformers in the circuits, provide dynamic storage or delay for one bit of information as well as re-shape and reform the pulse. Further, the pulseformer 12, as are the other pulseformers in the circuits, may be of the type shown in U.S. Patent 2,748,270, and assigned to the same assignee as the present invention, or as shown on page 185 in the publication of the Professional Group on Electronic Computers of the IRE, June 1961.

If the OR circuit 10 has delivered a pulse to the pulseformer 12, then the pulseformer 12 will delay the pulse so delivered and provide an output after the delay only if if a CP (Clock Pulse) has been applied during the time the OR circuit 10 provided an output to the pulseformer 12.

The output of the pulseformer 12 is connected as one input to the add network 14. The add network 14 functions as a logical half adder and more specifically a unit adder, the other input to the add network 14 being from the pulseformer 22. The sum output of the add network 14 is directed to the AND circuit 16. The AND circuit 16 functions as an inhibit gate at selected times in that pulses applied to the conductor 24 at the conclusion of the card read cycle will inhibit the output of the AND circuit 16 and thus in effect, clear the adding accumulator, which will hereinafter be described.

The pulseformer 18 receives inputs from the AND circuit 16, as well as clock pulses (which are of shorter duration than time pulses to be described below) and directs its output to the delay line 20. The delay line 20 may be of a type well known in the art and in the particular embodiment shown, the delay line 20 has a dynamic storage capacity in bits which is equal to the number of time pulses in the cycle (N) minus two.

The pulseformer 22 receives inputs from the delay line 20, as well as clock pulses, and directs its output to the add network 14 and to the AND circuit 26 of the subtracting accumulator, which will hereinafter be described.

The carry output from the add network 14 is coupled back to the OR circuit 10, to provide for carries into higher orders of the accumulator.

The pulseformer 12, as previously described, as all the other pulseformer circuits in the invention, provides a delay or storage equal to the time between clock pulses and operates at a frequency determined by the application of the clock pulses to the clock pulse input, as shown.

The elements hereinbefore described comprise the adding accumulator and more specifically include the pulseformer 18, the delay line 20, and the pulseformer 22 as well as the add network 14 and AND circuit 16, all of which form a recirculating loop. Each of the pulseformers 18 and 22, as are all other pulseformers, are capable of dynamically providing a bit delay whereas the delay line 20 provides a delay equal to the number of time pulses in the cycle minus two. Thus, the entire accumulator comprising the pulseformers 18 and 22 and the delay line 20 in the recirculating loop just described, will dynamically store and act as an accumulator for the storage of a number of bits equal to the number of time pulses in a machine cycle.

By way of example, in a practical embodiment operated in accordance with the principles of this invention, a machine cycle of ten time pulses is utilized. Thus, the delay line 20 stored eight bits, and with the inclusion of the storage or delay of the pulseformers 18 and 22, the entire adding accumulator has a dynamic storage of ten bits. Thus, the add accumulator, having the binary bit storage for ten bits, will store the decimal equivalent of 1023 bits which is derived by a summation of $$2^0+2^1+ \ldots 2^9$$

Figure 4:
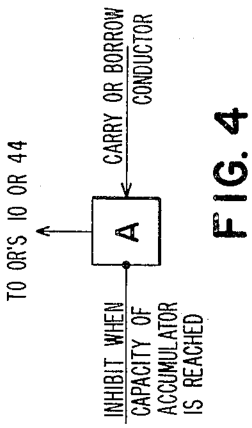

In effect then, the add accumulator will store a number representative of 1023 holes in a single punched card. If the maximum number of holes to be encountered in a single card is less than this, then the size of the delay line 20 (and 40) may be reluced accordingly. If an adding accumulator of a reduced size will permit checking of most all the cards, then circuitry may be inserted to error check all these cases with the exception of those few cases where the card contains more holes than the capacity of the accumulator. In other words, a savings in hardware may be obtained and still error check, say 99% of the cards. Such added circuitry would include an inhibit gate in the carry conductor of the add network 14, an inhibit gate in the borrow conductor of the subtract network 32, and a source of inhibit pulses. The inhibit pulses would be generated from the time pulses at TPN. Such a gate is shown in block diagram in the FIGURE 4.

The subtracting accumulator is similar to the adding accumulator hereinbefore described, and comprises the subtract network 32, AND circuit 34, the OR circuit 36, the pulseformer 38, the delay line 40, and the pulseformer 42. Further, the subtracting accumulator includes the AND circuit 26 whose function is to receive the output from the add accumulator and thus insert the contents of the add accumulator into the subtracting accumulator whenever the AND circuit 26 is enabled by pulses on the conductor 24. The pulses on the conductor 24 are also applied to the inhibit input of the AND circuit 34 to prevent the transfer of the output of the subtract network 32 to the subtract accumulator when the contents of the add accumulator are being inserted into the subtract accumulator. As noted previously, pulses are applied to the conductor 24 at the conclusion of the card read cycle at the first station. The number of pulses applied to the conductor 24 is equal to the number of time pulses in a cycle, so that the entire word or number stored in the add accumulator may be transferred to the subtract accumulator at the end of a card read cycle.

The outputs from the AND circuits 26 and 34 are buffered at the OR circuit 36, which OR circuit 36 is coupled to the input of the pulseformer 38. The AND circuit 34 will receive the difference output from the subtract network 32 and thus continue to recirculate the contents of the subtracting accumulator until the application of inhibit pulses on the conductor 24.

Input signals (Input B) in the form of pulses from the second card reading station are applied to the OR circuit 44 whose output is coupled to the pulseformer 46. The pulseformer 46 operates at a frequency determined by the application of the clock pulses and directs its output to the subtract network 32 in coincidence with the output of the pulseformer 42. Both the adding accumulator and the subtracting accumulator have a specific modular capacity. If the number of holes being checked is greater than the capacity then there is an overflow. This overflow must be prohibited from recirculating back into the first bit position of the accumulators or registers. If the overflow is allowed to recirculate, then the adder, on the recirculation route, will not be following the modular arithmetic. This overflow may be prohibited, as stated previously, by insertion of the circuit of FIGURE 4 in the carry and borrow conductors.

The error enunciation system comprises the AND circuit 50 and flip-flop 52. The AND circuit 50 receives output pulses from the pulseformer 42 of the subtracting accumulator and pulses on the conductor 24 which are applied at the conclusion of the card read cycle at the first reading station. Thus, if bits are still stored in the subtracting accumulator when TP pulses are applied to conductor 24, an error condition will be indicated and the circuit 50 will generate an output. The output of the circuit 50 is coupled to the set side of the flip-flop 52 and an error is thus indicated when the flip-flop is in this position. The error signal may be coupled to a light, an audible signal, or other signalling means. The flip-flop 52 is reset by the application of a pulse to the reset input, as shown. The flip-flop 52 would normally be reset at the start of each machine cycle or subsequent to the occurrence of an error.

For the purposes of explanation of the operation of the circuit, it will be assumed that a cycle comprises ten time pulses, TP 0 through TP 9 (N=10). It will be readily understood that the system can be simply adapted to operate with a cycle of any number of time pulses. In actual operation, the punched cards are sensed row by row, by equipment which is not shown. The row storage is then serialized (one bit serial) for inserting the bits in their correct positions in a word format for transmission to the hole count checker and to other equipment (not shown).

Figure 2:
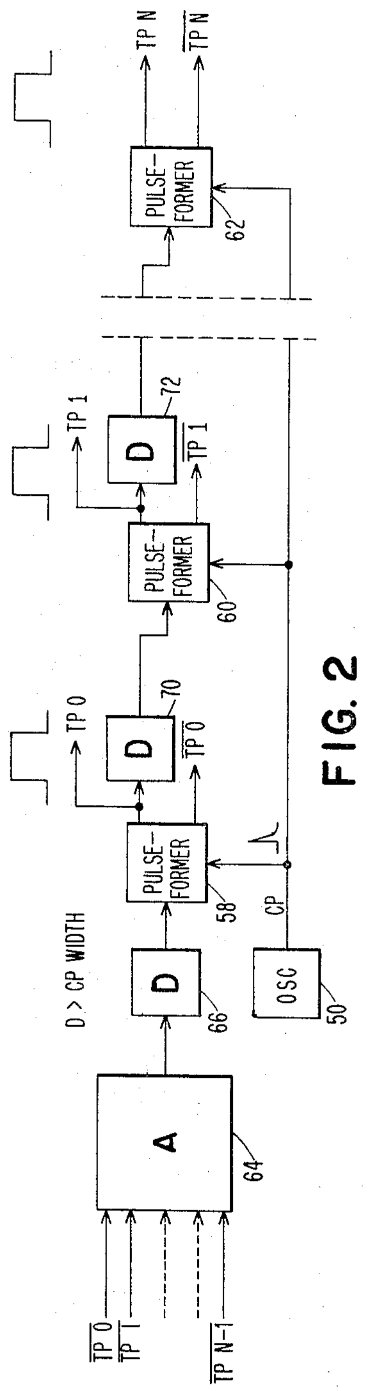
FIGURE 2 is a block diagram of a cycling unit for generating clock pulses and timing pulses.

The circuit of the FIGURE 2 is a cycling unit and will accept CP's (clock pulses) from the oscillator 50 and produce TP's (time pulses). The cycling unit forms no part of the present invention except to supply CP's and TP's to the circuits of the other figures. Initially, all the inputs (NOT signals) from the pulseformers 58, 60 and 62 are present at the AND circuit 64 and the output of the AND circuit 64 will be applied through the delay 66 to the pulseformer 58. The delay time (width) of the delay 66 is greater than the width of the clock pulse.

When the CP is applied to the pulseformer 58, TP 0 will be derived and at the same time $\overline{\text{TP 0}}$ is inhibited. Thus, the output of the AND circuit 64 is also inhibited. TP 0 is also applied to the delay 70 which will, after a prescribed delay, apply the pulse to the pulseformer 60. TP 0 disappears and before $\overline{\text{TP 0}}$ reappears, a CP is applied to pulseformer 60 causing TP 1 to be produced and $\overline{\text{TP 1}}$ to be inhibited. TP 1 is also applied to the delay 72 and down the line to produce the TP's. One of the NOT signals remains off to inhibit AND circuit 64 except after TP N. At that time, all NOT signals are available to AND circuit 64 and the cycle repeats.

Thus, pulses indicative of holes in a punched card will be supplied at input A from the first card reading station. As indicated, conventional means may be employed for hole counting, and that the pulses are supplied to input A serially. In addition, the pulses indicative of the holes in the card will be supplied coincidentally with time pulses and at TP 9. The pulse in position 1 at input A to buffer 10 (see FIG. 1) is presented to the pulseformer 12 at TP 9 of one cycle, the pulse in position 2 is presented to the pulseformer 12 at TP 9 of the following cycle, etc. The absence of a hole in the card at a particular location will be indicated by the absence of a pulse in the corresponding position at the input A. Pulses supplied to the OR circuit 10 are coupled to the pulseformer 12 which as noted hereinbefore provides a pulse forming operation as well as dynamic storage or delay for one bit. Coincident with the arrival of a pulse indicative of a hole in a punched card, are the clock pulses applied to the pulseformer 12.

The add network 14 is a conventional half-adder which forms sum or carry pulses accordingly as signals are applied to its inputs from either of the elements 12 or 22.

For the purposes of explanation, it will be assumed that the pulse train shown at input A represents holes in a punched card that are to be counted. At this point, it will be noted that the identical pulse train appears at input B but in practice this input train will not appear at input B until after the entire card is read at the first reading station and ten pulses are applied to the conductor 24 to transfer the sum in the adding accumulator to the subtracting accumulator. As noted hereinbefore, after the pulses representative of holes in the card are counted and applied to input A, the card is transferred to a second reading station (not shown) and the holes are again counted and pulses representative of the holes in the card, one pulse for each hole, are applied to input B and subtracted by the network comprising the subtracting accumulator and its peripheral circuits.

Figure 3:
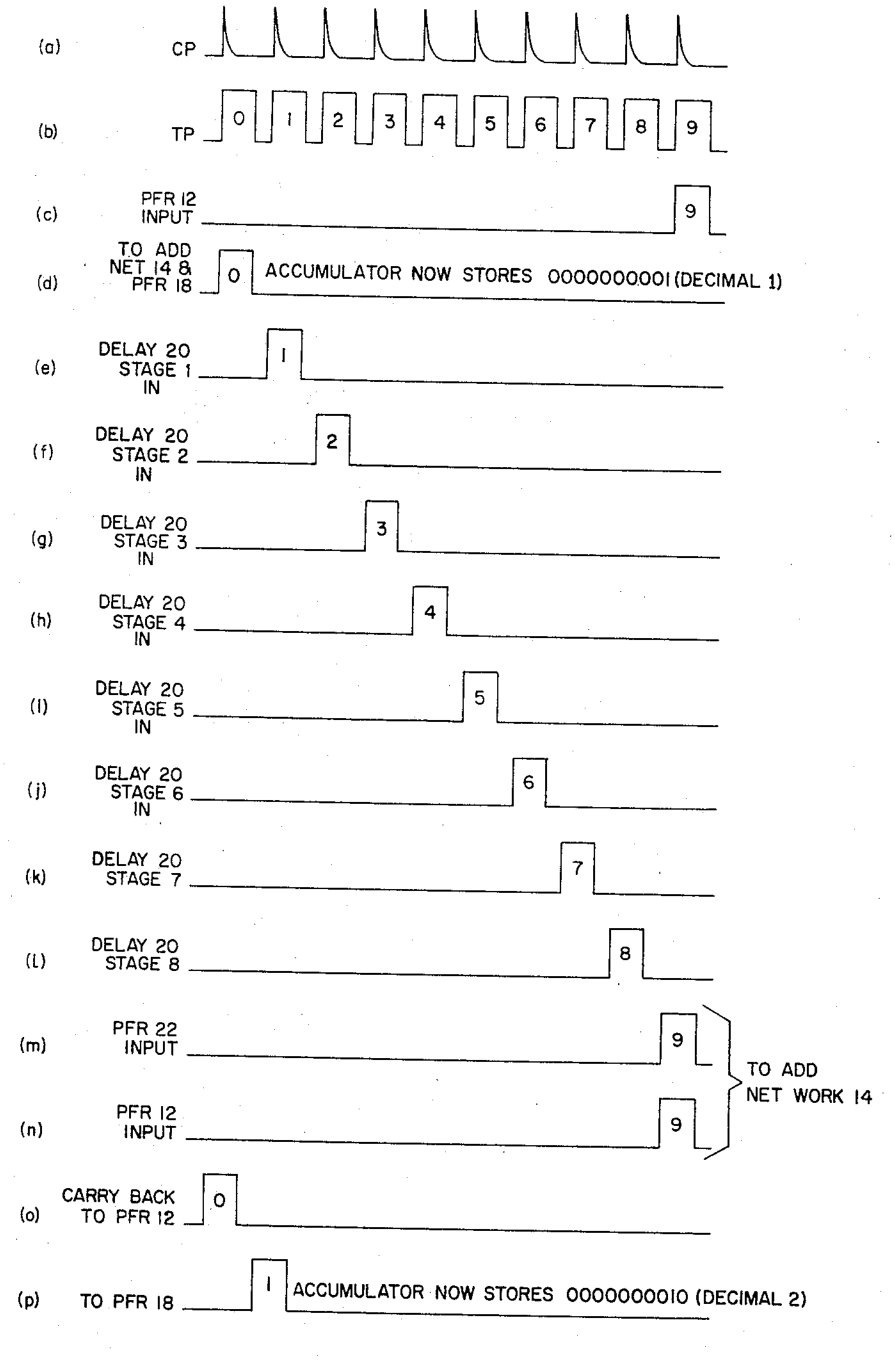
FIGURE 3 is a timing diagram or chart showing the pulses within the dynamic accumulators; and, FIGURE 4 is a block diagram of an inhibit gate.

Clock pulses are applied to the pulseformers 12, 18 and 22 and, as shown hereinafter, to the pulseformers 38, 42 and 46. The pulse in position 1 of the chain of pulses at input A is applied to the OR circuit 10 and the pulseformer 12 at TP 9, as shown at FIGURE 3(*c*). This pulse emerges from the pulseformer 12 and passes through the add network 14, the AND circuit 16 and arrives at the pulseformer 18 at TP 0, as shown at FIGURE 3(*d*). At TP 1, this pulse, formerly in position 1 of the chain of pulses shown at input A, enters the delay line 20 and emerges at eight time pulses later or at TP 9. The pulse is shown in FIGURES 3(*e*) through 3(*l*) as it is delayed in successive increments along the length of the delay line 20.

In order for the second pulse to be added numerically to the first pulse, it is necessary that the first pulse, which is now in the adding accumulator, be applied to the add network 14 simultaneously with the pulse at position 2 of the string of pulses shown at input A. As the pulse is transferred on the conductor from the delay line 20 to the pulseformer 22 at TP 9, the pulse in position 2 of the chain of pulses shown at input A is applied to the OR circuit 10 and the pulseformer 12 (see FIGURES 3(*m*) and 3(*n*). The addition of the pulse in position 1 with the pulse in position 2 at the add network 14, results in a carry which is applied back to the pulseformer 12 through the OR circuit 10 at the next time pulse, namely, TP 0 (see FIGURE 3(*o*)). No output is generated on the sum output terminal at this time. Thus, the least significant bit is now a zero (absence of a pulse). At TP 1, the pulse generated from the add network 14 on the carry terminal, emerges from the pulseformer 12 and is applied to the add network 14. Since no pulse is present from the pulseformer 22 at this time, a pulse appears on the sum terminal and is applied to the pulseformer 18 through the AND circuit 16. This is shown in FIGURE 3(*p*). Thus, the contents of the adding accumulator are now 0000000010 (decimal 2) with the least significant bit (a zero) just entering the delay line 20 and the second least significant bit (a one) just entering the pulseformer 18.

The addition of the pulses representative of holes in the punch card, shown for example at input A, are applied as previously stated at TP 9 (one position only at TP 9 which may or may not contain a pulse) and this results in the addition of the pulse in the add network 14 at a time coincident with the least significant bit of the binary number contained in the circulating adding accumulator. Thus, between the pulse shown at position 1 at the input terminal A and the pulse shown at position 2 of the same input A terminal. There is a period of 10 timing pulses so that the succeeding pulse is always added in to the circulating register in the least significant bit position. If no pulse appears at input A then no addition takes place in the add network 14 at the respective time pulse but the binary bit in the accumulator continues to recirculate in the adding accumulator.

In the example chosen for illustrative purposes, N was 10 thus resulting in the delay line storage of eight bits (ten minus two) plus two delays in the pulseformers 18 and 22, thus, making a total of a ten bit storage accumulator. In case the number of holes in a punched card exceeds the storage capacity of the accumulators, it will be necessary to inhibit the carry from the most significant order by the use of the circuit of FIGURE 4 or the logic of the circuit will not be followed as hereinbefore described.

As soon as the number of holes in the card have been read and the number entered into the adding accumulator as hereinbefore described, the card is moved to a second reading station (not shown) and the number of time pulses equal to the time pulses in a cycle are applied to the conductor 24. The application, in our particular example, of ten pulses on the conductor 24, will cause the AND circuit 26 to be strobed and as the contents of the adding accumulator are emitted from the pulseformer 22 to the AND circuit 26 coincidentally with the time pulses, the amount stored in the adding accumulator will thus be transferred to and entered into the subtracting accumulator. The adding accumulator will be cleared by the application of these ten time pulses to the inhibit input of the AND circuit 16 and the subtracting accumulator will also be cleared of a past amount so that the subtracting accumulator can now store the new amount just transferred to it from the adding accumulator. This clearing pulse is applied to the inhibit input of the AND circuit 34 from the conductor 24.

At the second reading station the card will be read and a pulse produced for each hole in the card, samples of which are shown at input B. These pulses are applied singularly at TP 9 to the pulseformer 46 and are subtracted in the subtract network 32, from the contents of the subtracting accumulator which were previously transferred into the subtracting accumulator from the adding accumulator. The operation of the subtracting accumulator is identical to the operation of the adding accumulator except for the feature of subtracting a one from the contents of the accumulator rather than adding.

While the first card is being read at the second reading station and the pulses representative of the holes in the card are being applied to the subtracting network 32, a second card has been moved into position to be read at the first reading station and thus place a number representative of the number of holes in the second card in the adding accumulator.

At the conclusion of the reading of the first card at the second reading station, time pulses will be applied to the conductor 24 as previously described and it will be noted that these pulses are applied to the AND circuit 50, which AND circuit has an input coupled from the pulseformer 42. If the contents of the subtracting accumulator, comprising in general the elements 32, 34, 36, 38, 40 and 42 of the recirculating loop has not returned to zero, then a bit or bits will still remain in the subtracting accumulator and will be applied to the AND circuit 50 from the pulseformer 42 sometime during the application of pulses to the conductor 24. If the number of holes counted at the first station is less than the number of holes counted at the second station, (i.e., the subtracting accumulator cleared "early") then the subtract network 32 operates in such a manner that pulses applied to the pulseformer 46 (and network 32) in excess of the count stored in the subtracting accumulator, will cause the subtract network 32 to produce ones (indicative of the number of clock pulses applied after the subtract accumulator reached zero) and, thus, still indicate an error when the inhibit and transfer pulses are applied to the conductor 24. Coincidence of pulses at the AND circuit 50 will place the flip-flop 52 in a set condition and thus indicate that an error exists in that the number of holes in the card read at the first reading station did not coincide with the number of holes in the card read at the second reading station. If an error is indicated, the flip-flop 52 would be reset after the error condition has been removed by the application of a pulse on the reset input.

The operation of the circuit continues as hereinbefore described, by the second card, which was read at the first reading station and applying pulses to input A, being moved to the second reading station after the application of pulses on the conductor 24 and which not only transfers the contents of the adding accumulator to the subtracting accumulator but also checks for an error condition by the application of pulses to the AND circuit 50.

Thus, there has been described a hole count checker wherein the number of holes in a punched card are determined at a first reading station, placed in a dynamic storage register or adding accumulator, recounted at a second reading station along with the transferral of the number of holes in the card from an adding accumulator to a subtracting accumulator, and, the counting or determination of the number of holes in the same card at a second reading station and subtracting this number from the number transferred to the subtracting accumulator. If the subtracting accumulator has not returned to zero, then the number of holes read at the first station and at the second station is not the same and thus an error condition exists. As the least significant bit emerges from the pulseformer 22, a pulse is simultaneously applied to an add network to result in the addition of a bit to the adding accumulator. Any carries are added in at subsequent clock pulse times.

Stated simply, as the card is read the number of holes are counted and the number inserted into the adding accumulator. At the conclusion of the card reading at the first station, the contents of the adding accumulator are transferred to a second accumulator known as a subtracting accumulator. The same card is then read at a second reading station and for each hole in the card, a pulse is generated and applied to the subtracting accumulator in such a manner that a bit is subtracted from the accumulator for each hole. At the conclusion of the second reading process the contents of the subtracting accumulator should be zero. If the contents are not zero, an error condition exists and will be so detected.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

The embodiments of the invention in which an exclusive property or privilege is claimed are defined as follows:

1. An error detecting device in a punched card reading system comprising:

(a) a first register for accumulating electrical signals indicative of the number of apertures in a punched card sensed at a first station;

(b) said first register including an add network;

(c) a second register for accumulating electrical signals indicative of the number of apertures in the same punched card sensed at a second station;

(d) said second register including a subtract network and responsive to pulses directly from said second station;

(e) intercoupling means for transferring said electrical signals in said first register to said second register subsequent to the accumulation from the first station and before the accumulation from the second station;

(f) and means for operating said subtract network after said intercoupling means has transferred said electrical signals in said first register to said second register.

2. The combination as defined in claim 1 wherein both of said registers are loop-type recirculating accumulators.

3. The combination as defined in claim 1 wherein said intercoupling means for transferring includes means for clearing said first register as said electrical signals accumulated in said first register are transferred.

4. Means for determining the accuracy of document reading stations the combination comprising:

(a) a first loop-type accumulator including an add network for accumulating signals indicative of the number of holes in a punched card read at a first station and retaining said number in dynamic form;

(b) a second loop-type accumulator including a subtract network for subtracting signals indicative of the number of holes in the same card and read at a second station;

(c) circuit means for transferring signals from said first accumulator to said second accumulator, whereby the signals indicative of the number of holes in the card read at a second station is subtracted from the signals indicative of the number of holes in the same card read at a first station;

(d) and means coupled to said second accumulator for selectively sensing the signals in said second accumulator.

5. The combination as defined in claim 4 wherein both of said accumulators include means to be driven at a clock-pulse rate.

6. The combination as defined in claim 4 including alarm means coupled to said means for sensing.

7. An error checking circuit for determining the number of apertures in a punch document; the combination comprising:

(a) a first loop-type register;

(b) said register including within said loop a delay means and an add network;

(c) a second loop-type register;

(d) said second register including within said loop a second delay means and a subtract network;

(e) means coupled to said add network for entering a series of pulses indicative of the number of apertures in a document;

(f) means for transferring the series of pulses to said second register;

(g) means coupled to said subtract network for entering a series of pulses indicative of the number of apertures in the same document and means for examining said second register at a particular point in time to determine if said second register contains pulses.

8. An error checking circuit comprising: first means for accumulating electrical signals representative of indicia upon a record sensed at a first sensing station; second means for storing electrical signals; transfer means coupled to said first and second means to transfer the electrical signals stored in said first means to said second means for storage therein; input means for producing electrical signals representative of indicia upon a record sensed at a second sensing station; subtraction means coupled to said second means and said input means to subtract the electrical signals indicative of the indicia upon a record sensed at said second sensing station from said electrical signals representing the indicia upon a record sensed at said first sensing station and second transfer means coupled to said subtraction means and said second means whereby said second means stores electrical signals representative of the indicia upon a record sensed at a first sensing station diminished by the electrical signals representative of the indicia upon said record sensed at a second sensing station.

9. An error checking circuit as defined in claim 8 further including a detection means coupled to said second means to provide an error signal if the electrical signals indicative of the indicia upon said record sensed by said first sensing station differ from the electrical signals indicative of the indicia upon said record sensed by said second sensing station.

10. An apparatus for determining the accuracy of indicia upon a record sensed by a record sensing device comprising: an add network, having two input terminals and an output terminal; first input means coupled to a first of said two input terminals of said add network to impress upon said first add network input terminal electrical signals indicative of the indicia sensed from a record at a first record sensing station; first dynamic storage means coupled to said add network output terminal and to the second of said two add network input terminals, said first dynamic storage means capable of storing electrical signals representative of the indicia sensed from said record at said first record sensing station; a subtract network, having two input terminals and an output terminal; second input means coupled to a first of said two input terminals of said subtract network to impress upon said first subtract network input terminal electrical signals indicative of the indicia sensed from said record at a second sensing station; second dynamic storage means coupled to said subtract network output terminal and to the second of said two subtract network input terminals, said second dynamic storage means capable of storing electrical signals representative of the indicia sensed from said record at said first record sensing station; and first transfer means coupled to first and second dynamic storage means to transfer the contents of said first dynamic storage means to said second dynamic storage means whereby the electrical signals representative of the indicia sensed from said record at said second sensing station is subtracted from the electrical signals representative of the indicia sensed from said record at said first sensing station.

11. An apparatus as defined in claim 10, further including detection means coupled to said second dynamic storage means to provide an error signal if electrical signals are present in said second dynamic storage means at the completion of said subtraction.

12. An apparatus for determining the accuracy of indicia upon a record sensed by a record sensing device comprising: a first closed loop accumulator for receiving and additionally accumulating electrical signals indicative of indicia upon a record sensed at a first sensing station; first input means coupled to said first accumulator to provide electrical signals indicative of the indicia upon a record sensed at a first sensing station; a second closed loop accumulator for receiving and subtractively accumulating ing electrical signals; transfer means coupled to said first and second accumulators for transferring the electrical signals in said first accumulator to said second accumulator; second input means coupled to said second accumulator to provide electrical signals indicative of the indicia upon a record sensed at a second sensing station; said second accumulator subtracting the electrical signals from said second input means from said electrical signals stored in said second accumulator; and detection means coupled to said second accumulator to provide an error signal if electrical signals are present in said second accumulator at the completion of said subtraction.

References Cited

UNITED STATES PATENTS

| | | | |
|---|---|---|---|
| 2,359,616 | 10/1944 | Bryce | 235—61.7 |
| 2,848,532 | 8/1958 | Weida | 235—177 X |
| 2,871,289 | 1/1959 | Cox | 340—146.1 X |
| 3,114,894 | 12/1963 | Arneth | 340—146.1 |
| 3,024,980 | 3/1962 | Droege | 235—61.7 |

DARYL W. COOK, *Primary Examiner.*

W. S. POOLE, *Assistant Examiner.*